US007680755B2

United States Patent
Machani

(10) Patent No.: US 7,680,755 B2
(45) Date of Patent: Mar. 16, 2010

(54) AUTOMATIC DETECTION AND CLASSIFICATION OF A MOBILE DEVICE

(75) Inventor: Salah Machani, Toronto (CA)

(73) Assignee: Diversinet Corp., Toronto (CA)

( * ) Notice: Subject to any disclaimer, the term of this patent is extended or adjusted under 35 U.S.C. 154(b) by 351 days.

(21) Appl. No.: 11/604,026

(22) Filed: Nov. 24, 2006

(65) Prior Publication Data

US 2008/0126286 A1      May 29, 2008

(30) Foreign Application Priority Data

Aug. 18, 2006   (CA) .................................... 2556464

(51) Int. Cl.
*G06F 15/18* (2006.01)
(52) U.S. Cl. ....................................................... 706/47
(58) Field of Classification Search ........................ None
See application file for complete search history.

(56) References Cited

U.S. PATENT DOCUMENTS

| 2005/0143136 A1* | 6/2005 | Lev et al. ..................... 455/566 |
| 2006/0010226 A1* | 1/2006 | Hurtta et al. ................ 709/217 |
| 2006/0019632 A1* | 1/2006 | Cunningham et al. ....... 455/408 |
| 2006/0047704 A1* | 3/2006 | Gopalakrishnan ........ 707/104.1 |
| 2008/0040175 A1* | 2/2008 | Dellovo ........................ 705/7 |

* cited by examiner

*Primary Examiner*—David R Vincent
*Assistant Examiner*—Ola Olude-Afolabi
(74) *Attorney, Agent, or Firm*—Lang Michener LLP

(57) ABSTRACT

The invention consists of a method of automatically detecting and classifying a device, comprising: a) receiving information from the device; b) looking up the information in a device directory to identify the device; c) applying a series of identity rules if the information is not found in the device directory; and d) identifying the device from the identity rules. Preferably, the device is a mobile device.

10 Claims, 1 Drawing Sheet

AUTOMATIC DETECTION AND CLASSIFICATION OF A MOBILE DEVICE

FIELD OF THE INVENTION

The present invention relates to the field of security and encryption. In particular, it relates to methods of automatically detecting and classifying a device upon contact with a remote secure server.

BACKGROUND OF THE INVENTION

The rapid increase in the use of mobiles devices, such as cellular phones, Personal Digital Assistants (PDAs) and similar devices to access the Internet has greatly increased the usefulness and accessibility of a number of applications, while at the same time creating a problem for the developers of those applications. As the type of device used to access the application may vary, so do the software requirements for that device, as there is little standardization of software and operating system platforms between competing manufacturers.

When a device accesses an application over the Internet, it sends information about itself to the application in an HTTP header information such as the type of browser being used and the type of device. This combination of information can be used to define and identify the device. Identification of the device is the key element in enabling support for multiple devices in a single application.

An issue that arises is the proper and consistent identification of the device which is accessing the application. Different mobile devices support and use different software, and in order to ensure that the proper version of the software is downloaded to the device to support the application, a mechanism is needed to identify the device and its software without user intervention.

Additionally, this device identification mechanism should be able to identify and support new devices as they are introduced, and not be limited only to those devices already supported.

SUMMARY OF THE INVENTION

The invention consists of a method of automatically detecting and classifying a device, comprising: a) receiving information from the device; b) looking up the information in a device directory to identify the device; c) applying a series of identity rules if the information is not found in the device directory; and d) identifying the device from the identity rules. Preferably, the device is a mobile device.

The method may further include an additional step e) of adding the device to the device directory.

Preferably, the identity rules consist of two sets of rules: a series of classification rules for identifying the device based on the information and a series of conflict rules for determining when the classification rules have identified the device.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein.

DETAILED DESCRIPTION OF THE PREFERRED EMBODIMENTS

Figure 1:
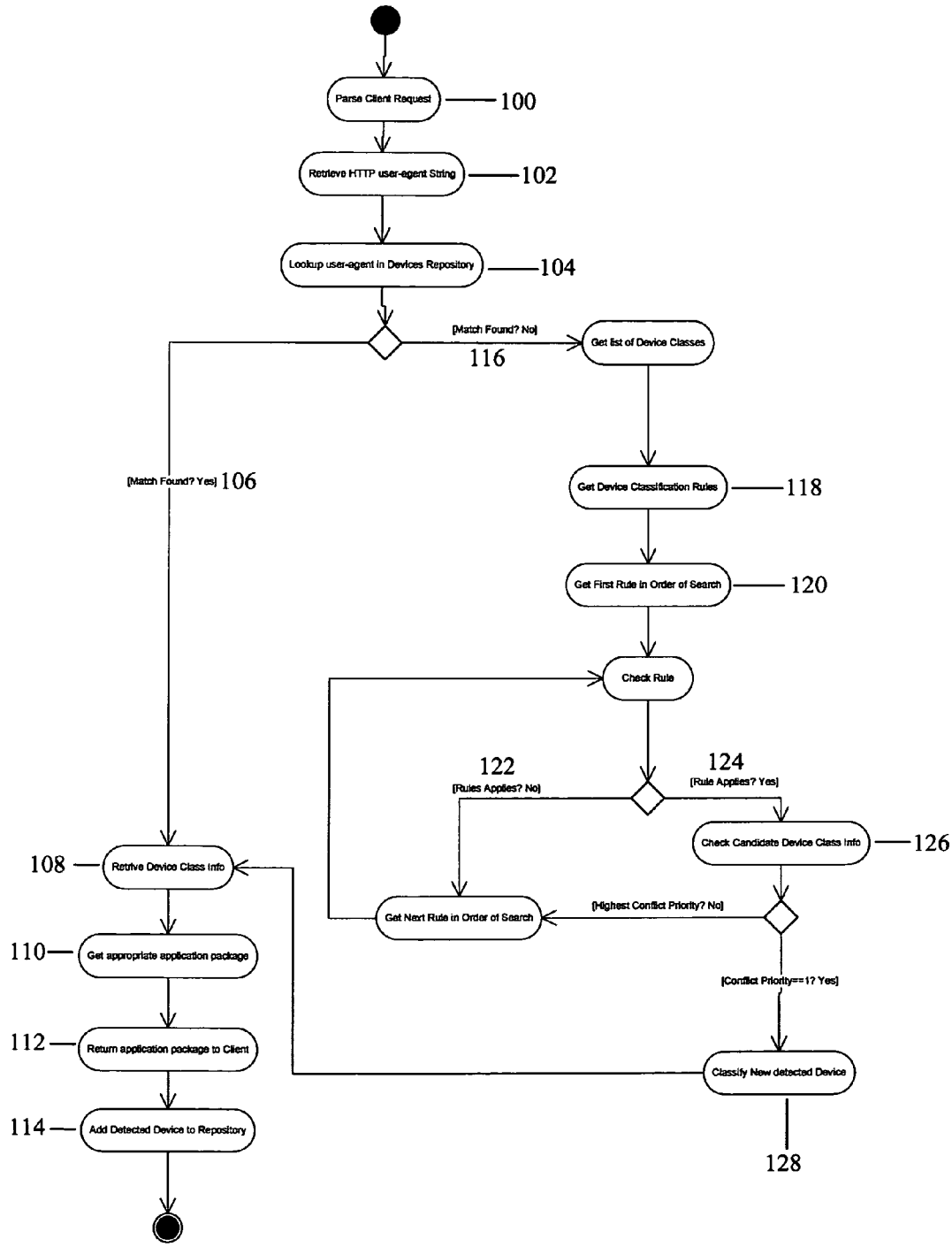
FIG. 1 is a flow chart outlining a preferred method of the present invention.

The inventive method presented herein consists of a method of identifying a device at the time the device contacts a server in order to ensure the device has the appropriate execution environment for the requested software package. The method consists of collecting information to identify the device, determining if the device is in the existing database, and if not, applying a series of rules to identify the device. Once the device is identified, it is then added to the database if not already present.

There is a need to rapidly identify mobiles devices which contact remote servers in order to provide the proper software based on the hardware and operating system of the mobile device. As there are multiple types of devices, and multiple different operating systems for each device, providing the maximum support for as many different devices as possible is a significant issue.

Compounding the problem is the continual release of new devices. While the upcoming release of a new hardware device and/or an operating system upgrade is typically known in advance, it may not be possible to update a detection database prior to release. Furthermore, not all servers may upgrade their databases in a timely manner.

The inventive method, as shown by the flow diagram in FIG. 1, fundamentally consists of three broad steps. First, the server receives information from the device that contains information that can be used to identify the device, both in terms of type (hardware) and operating system (software). Second, the existing device database, ideally stored on an updatable memory format, such as flash memory or a hard disc drive, is checked to determine if the device is in the database. If so, the appropriate software application for accessing the server is sent to the device by the server. If not, then a series of rules is applied to identify the device and determine the appropriate software application required. Then, the appropriate software application is sent and the new device is added to the device database.

In the application of the rules, two types of identity rules are used. First is a list of classification rules. Each classification rule is applied in order until a positive result is achieved. Second, a list of conflict rules exists in the event that the positive result of the classification rule is insufficient to completely identify the device or if a device satisfies more than one classification rule. Between the two sets of rules, a new device that is not present in the database can be rapidly identified and classified and then added to the database.

A preferred embodiment of the method is shown as a flow diagram in FIG. 1. When a client request 100 is received by the server, an identifying code 102, such as an HTTP user-agent string, is extracted and compared 104 against information in the existing device database in order to identify the device.

If a match is found 106, then the class information for that device is retrieved 108 and the appropriate software application package for that class is identified 110 and sent 112 to the device for installation. A record is also made 114 of which device was identified to be used for subsequent detection of similar device types.

If no match is found 116, then the rule-based identification method is executed. The classification rule set is loaded 118 and the first classification rule on the list is applied 120. If the classification rule does not apply to the device 122, then the next classification rule is applied until a match is found. If the information from the device is matched 124 with the classification rule, then a corresponding conflict rule is checked 126 to determine if the matched classification rule(s) is determinative of the device type, based on the priority of the classification rule. If not, then the next classification rule is applied until another match is made and another conflict rule check is made.

An example of classification and conflict rules that can be used is shown below:

If Device user-agent string contains "Symbian" and "Series60" keywords then device if of class Symbian-Series60, rule priority=1

If Device user-agent string contains "MDIP" and "CLDC" keywords then device if of class J2ME, rule priority=2

Using these classification rules, a connected device sending the following user-agent string: "Nokia6630/1.0 (2.3.129) SymbianOS/8.0 Series60/2.6 Profile/MIDP-2.0 Configuration/CLDC-1.1" will match both of the rules above. However, using the conflict rules, the first rule has a higher priority order than the second rule and the hence the device will be classified as of Symbian-Series60 class.

Once the conflict rule is cleared and the classification rules are determinative, the device is identified 128 according to the results of the classification rules and the class information retrieved 108 and software application package sent out 112 as described above. At the record step 114, in addition to recording which device was identified, a new device record is created and added to the database. When devices of the same type contact the server in the future, they are now located and identified in the database, without proceeding through the rules inquiry.

While the above method has been presented in the context of mobile devices, such as mobile phones, the method is equally applicable to fixed devices, such as laptop or desktop PCs, as well. Fixed devices generally have superior integrated security measures in comparison to mobile devices and are subject to more gradual change in device types and numbers, however, the simplicity and device-branding capabilities of the method presented herein provide these same security and identity benefits to fixed devices as well.

This concludes the description of a presently preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

What is claimed is:

1. A method of automatically detecting and classifying a device using a server, comprising:
   a) receiving information from said device;
   b) looking up said information in a device database stored in updatable storage of the server to identify said device;
   c) applying a series of identity rules if said device is not identified by looking up said information in said device database; and
   d) identifying said device from said identity rules.

2. The method of claim 1, wherein said device is a mobile device.

3. The method of claim 1, wherein said method includes an additional step of: e) adding said device to said device database.

4. The method of claim 1, wherein said identity rules consist of two sets of rules: a series of classification rules for identifying said device based on said information and a series of conflict rules for determining when said classification rules have identified said device.

5. The method of claim 1, wherein said information consists of a User Agent string which is parsed as part of steps b) and c).

6. A server for detecting and classifying a device, comprising:
   a) a secure service which contains applications accessible by said device and software for various devices which enables said various devices to access said server;
   b) a device database stored in updatable storage of said server containing a list of known devices and which is updatable; and
   c) a logic unit capable of applying a set of rules to identify devices not listed in said device database and adding new devices to said device database.

7. The system of claim 6, wherein said devices are mobile devices.

8. The system of claim 6, wherein said identity rules consist of two sets of rules: a series of classification rules for identifying said devices based on said information and a series of conflict rules for determining when said classification rules have identified said devices.

9. The system of claim 6, wherein said logic unit identifies said devices based on information received from said devices.

10. The system of claim 9, wherein said information comprises a User Agent string.

* * * * *